E. E. BUSH.
WINCH ATTACHMENT.
APPLICATION FILED JAN. 15, 1917.
1,301,224.
Patented Apr. 22, 1919.
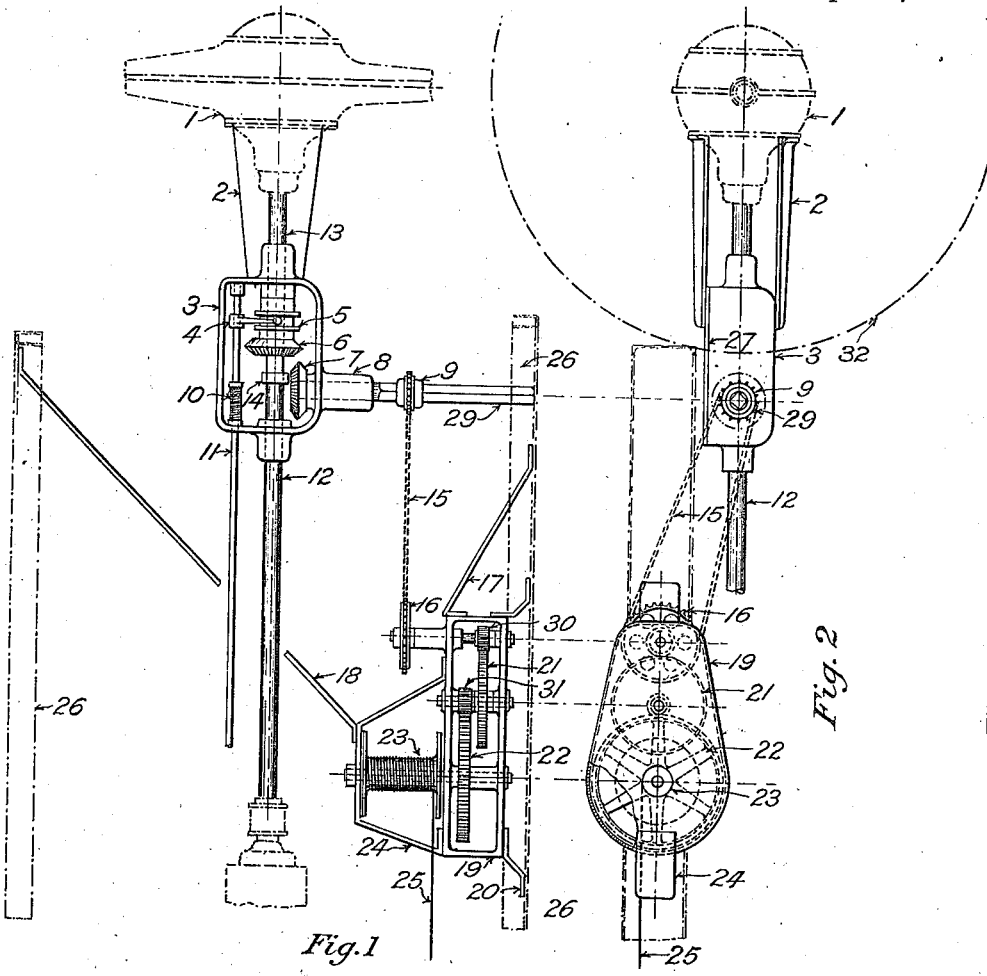
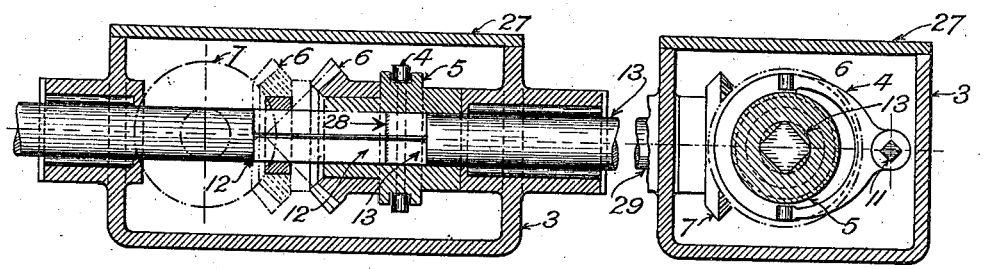
Fig. 3
Fig. 4
Witnesses
Inventor
Elkery Edwin Bush

UNITED STATES PATENT OFFICE.

EPPSEY EDWIN BUSH, OF GALVESTON, TEXAS.

WINCH ATTACHMENT.

1,301,224.  Specification of Letters Patent.  Patented Apr. 22, 1919.

Application filed January 15, 1917. Serial No. 142,577.

*To all whom it may concern:*

Be it known that I, EPPSEY EDWIN BUSH, a citizen of the United States of America, residing at Galveston, in the county of Galveston and State of Texas, have invented a new and useful Winch Attachment for Automobiles, of which the following is a specification.

This invention relates to a winch attachment for automobiles adapted for use in extricating the automobile from mud, ditch or rut, or drawing the same up a short, steep incline, by means of a winch and cable operated by the motor of the automobile.

The invention consists in the novel features of construction hereinafter described, pointed out in the claims, and shown in the accompanying drawings, in which:—

Figure 1 is a plan view of my device and connecting parts of an automobile.

Fig. 2 is a side elevation of Fig. 1.

Fig. 3 is a longitudinal section through a transmission box.

Fig. 4 is a transverse section through the box.

In the drawings 1 is a housing for the rear end of a drive shaft having a rear section 13 and forward section 12, said sections joining at 28 within a transmission box 3 supported by a casting 2 extending from the housing 1.

Extending into said box is a slidable rod 11 which may be extended to and operated from a seat of the automobile or connected to a suitable lever, not shown, operable from any convenient part of the car.

The sections 12 and 13 have within the box squared abutting portions which carry a miter gear 6 adapted to be shifted along the shaft through the medium of a collar 5 and a yoke 4, the latter carried by the rod 11, into mesh with a gear 7. In this position the miter gear clears the shaft 13, which becomes disconnected from the shaft 12. A bearing 8 carried by a side of the box 3 supports one end of a transmission shaft 29 the opposite end of which is journaled on the automobile frame 26. This shaft carries the gear 7 at its inner end. A sprocket wheel 9 is fixed on the shaft 29 and a chain 15 runs from the sprocket 9 to a sprocket 16.

A winch frame 19 and drum frame 24 are secured in place and braced by brackets 17, 18 and 20. The winch consists of drum 23, on which winds a cable 25, and a gear train consisting of a drum gear 22, pinion 31, intermediate gear $2^1$ and pinion 30, the latter being driven from the sprocket 16.

The box 3 is provided with a cover 27. A rear wheel of the automobile is indicated by dotted lines as at 32.

When the automobile is to be extricated from sand, mud or other obstruction and no convenient post or tree is available, a stake, not shown, can be driven in the ground one hundred or more feet in advance of the automobile, and the cable 25 unwound and secured thereto. By sliding the rod 11 forward the gears 6 and 7 are brought into mesh and the cable rewound, thus drawing the car to the fixed end of the cable or as near as may be necessary to extricate it. A spring 10 returns the rod 11 and gear 6 to normal position on release of the rod.

By arranging the miter gear 6 so that when it is in mesh with the gear 7 on the transmission shaft 29 the rear axle is disconnected, I not only avoid driving the rear wheels while operating the drum, but I am also able to use the engine of the automobile for other useful purposes other than operating a winch.

What I claim is:—

1. In a device of the kind described, a sectional drive shaft having abutting squared portions, a miter gear slidable on said portions, and in normal position connecting said shaft sections, a transmission shaft at right angles to said drive shaft, a gear thereon, and means for drawing the miter gear into meshed engagement with the transmission shaft gear, the drive shaft sections being disconnected during such gear engagement and automatic means for returning and holding the sliding gear in its normal position.

2. A device of the kind described, a shaft comprising alined sections, one of said sections constituting a driving element and a second of said sections constituting a driven element, a box supporting the adjacent end portions of the sections, said adjacent end portions being angular in cross section, a transmission shaft supported by the box, and arranged at an angle to the first named shaft, a gear slidable on the angular end portions of the sections of the first named shaft and, in normal position, connecting said sections for unitary rotation, a gear fixed to the transmission shaft, a rod extending in the same general direction as the first named shaft and having sliding movement through the box, a connection between the rod and the first named gear whereby said first named gear may be moved into engagement with the gear of the transmission shaft, said first named gear when in engagement with the gear of the transmission shaft being free of the driven section of the first named shaft, and a spring coacting with the rod and the box for returning and maintaining the first named gear in its normal position.

EPPSEY EDWIN BUSH.

Witnesses:
FRANK CAMPBELL,
JNO. J. NEIS.